United States Patent [19]

Tillich

[11] Patent Number: 4,560,980
[45] Date of Patent: Dec. 24, 1985

[54] METHOD OF TYPING SCRIPTS WHOSE CHARACTERS ARE ARRANGED NEXT TO ONE ANOTHER IN ROWS OR UNDERNEATH ONE ANOTHER IN COLUMNS

[75] Inventor: Peter Tillich, Wilhelmshaven, Fed. Rep. of Germany

[73] Assignee: Olympia Werke AG, Wilhelmshaven, Fed. Rep. of Germany

[21] Appl. No.: 438,493

[22] Filed: Nov. 2, 1982

[30] Foreign Application Priority Data

Dec. 9, 1981 [DE] Fed. Rep. of Germany ....... 3148684

[51] Int. Cl.[4] .............................................. G09G 1/00
[52] U.S. Cl. ................................... 340/727; 340/751; 340/790
[58] Field of Search ................ 340/727, 735, 790, 751

[56] References Cited

U.S. PATENT DOCUMENTS

| | | | |
|---|---|---|---|
| 3,158,857 | 11/1964 | Crosno et al. | 340/727 |
| 3,421,044 | 1/1969 | Murdock et al. | 340/727 |
| 3,864,692 | 2/1975 | McDonnell et al. | 346/75 |
| 3,924,225 | 12/1975 | Langnickel | 340/324 |
| 3,976,982 | 8/1976 | Eiselen | 340/727 |
| 4,267,555 | 5/1981 | Boyd et al. | 340/727 |
| 4,267,573 | 5/1981 | Chaikin et al. | 340/727 |
| 4,271,476 | 6/1981 | Lotspeich | 340/727 |
| 4,400,697 | 8/1983 | Currie et al. | 340/727 |
| 4,486,745 | 12/1984 | Konno | 340/727 |

FOREIGN PATENT DOCUMENTS 2620217 12/1976 Fed. Rep. of Germany .

Primary Examiner—Marshall M. Curtis
Attorney, Agent, or Firm—Spencer & Frank

[57] ABSTRACT

A method of displaying types of script whose characters are arranged next to one another in rows or underneath one another in columns, by means of a raster-type display device or a vectorially controlled display device which receives its control signals from a character generator which can be controlled so that its output signals to the display device cause the displayed characters to be either upright or rotated by 90° (lying down) horizontally next to one another. With the latter mode of operation, a record carrier taken from a recording device and rotated by 90° (or a video screen rotated by 90°) then shows the printed text in the desired shape in which the characters are arranged underneath one another in columns.

12 Claims, 3 Drawing Figures

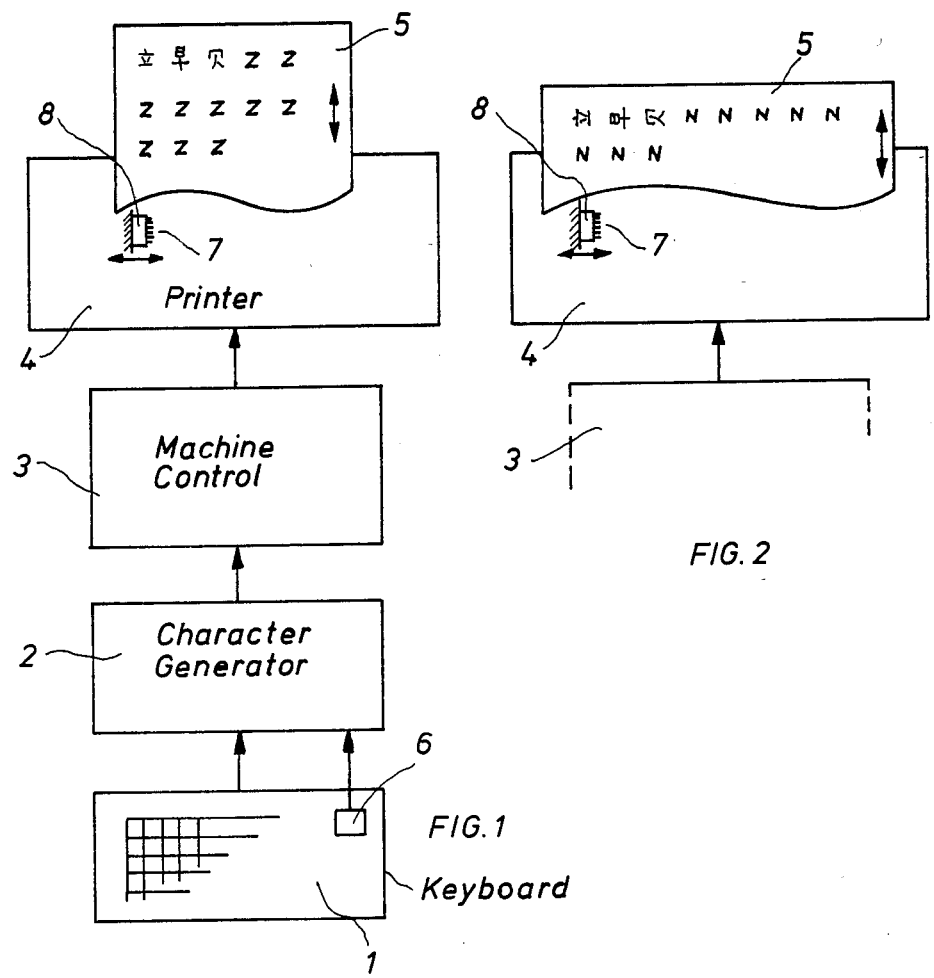
FIG. 2
FIG. 1
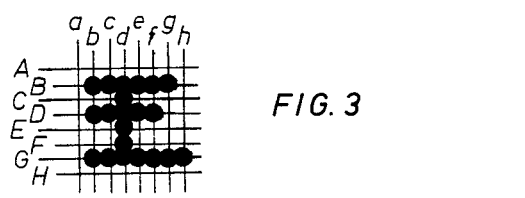
FIG. 3

METHOD OF TYPING SCRIPTS WHOSE CHARACTERS ARE ARRANGED NEXT TO ONE ANOTHER IN ROWS OR UNDERNEATH ONE ANOTHER IN COLUMNS

BACKGROUND OF THE INVENTION

The present invention relates to a method for the printing or displaying of scripts whose characters are arranged next to one another in rows or underneath one another in columns. More particularly, the present invention relates to such a method wherein the printing or displaying takes place by using a raster-type recording device or a vectorially controllable recording device and a character generator which, from the data of a stored character supply, derives actuation signals for the elements of the raster recording device or for the deflection signals for the recording element of the vectorially controllable recording device producing the output characters.

Some scripts, for example the Chinese script, are of the type that texts can be arranged by the horizontal alignment of characters in rows and placing the rows one underneath the other as well as by the vertical arrangement of the characters in columns and arranging the columns next to one another. While in a handwritten text the horizontal or vertical arrangement can be freely selected without difficulty, different machine functions are required if such texts are printed by machine. Such different machine functions are, for example different shifting of paper and printing mechanism, different margin controls etc. in printers, and different controls for video screens. Therefore two machines performing different functions must be used for one and the same script if texts are to be printed in the above-stated different formats.

SUMMARY OF THE INVENTION

It is the object of the present invention to provide a machine which is able to selectively produce texts in both above-described formats.

The above object is achieved, according to the present invention by a method for machine displaying scripts whose characters are arranged in rows one next to the other or in columns one underneath the other using a raster-type display device or a vectorially controllable display device and a character generator which, from the data of a stored character supply, derives actuation signals for the elements of the raster display device or for the deflection signals for the recording element of the vectorially controllable display device, wherein the said method includes: deriving, by means of the character generator and in response to an input signal corresponding to a desired character, actuation signals for the display device representative of the desired character; displaying the desired character in response to said actuation signals; providing a first selectable mode of operation wherein the actuation signals cause characters of a display line to be displayed upright horizontally next to one another, and a second selectable mode of operation wherein the actuation signals cause the characters of a display line to be displayed rotated by 90° with respect to the characters in the first mode (lying down); and selecting one of the first and second modes of operation.

The advantages of the present invention are particularly that the same machine can be used for different types of users and for different applications. Thus the machine manufacturer is no longer required to develop and produce machines with different function sequences for the same language field and the user is no longer limited to one printing format or required to use different machines for different printing formats.

BRIEF DESCRIPTION OF THE DRAWINGS

FIGS. 1 and 2 are block diagrams illustrating the two modes of operation according to the invention in an apparatus for carrying out the method of the invention.

FIG. 3 shows a character pattern for use in one example of an apparatus as shown in FIGS. 1 and 2.

DETAILED DESCRIPTION OF THE PREFERRED EMBODIMENTS

The simplified block circuit diagram of FIG. 1 shows a typewriter for Chinese characters and the functional blocks of the typewriter required for an understanding of the invention. Character input is effected via a keyboard 1 where, according to a fixed input code, a certain number of keys must be actuated in a defined sequence for each Chinese character to be printed. The resulting keyboard signal representing a particular character is fed to a character generator 2 wherein it is converted into an input code which feeds the data required for printing the character to a machine control 3. The machine control 3 derives therefrom the necessary control signals to operate the raster printer 4. A printing system of this kind using an ink jet printing head for the display of characters by a combination of dots within a raster field is manufactured by the assignee of this application and publicly known as Olympia 1011 Electronic Memory Typewriter for Chinese Characters.

The data corresponding to each character in the character supply provided in the machine and required for assembly of the characters are stored in a memory of the character generator 2 and can be fed to the machine control 3 by the actuation of the respectively associated keys on keyboard 1. Expediently, the machine control 3 is formed of a microcomputer which controls and determines all function sequences of the printer 4.

The printer 4 may be an ink jet printer, a mosaic printer, a thermoprinter or the like, of known design which produces any desired character by a combination of dots disposed on the display medium or paper 5. As an example, it is assumed there that each character is formed within a raster field containing 8×8 dots, as shown in FIG. 3. The printing head 8 of the raster printer 4 has available eight printing elements 7 arranged in a column one below the other, which are able to produce the dots of one raster column for a character to be printed. This column of printing elements is moved across the paper 5 horizontally in steps, and every eight steps produces all dots of the matrix of one character. After the characters of one line of print have been printed in this way, the printing head 8 is returned toward the left to its starting position, and the paper 5 is moved on by one line.

The data of the characters in the character generator 2 contain information according to which selected printing elements are actuated for each column a through h in rows A through H as shown in FIG. 3. In this way, recognizable characters are produced on the record carrier 5 as shown in FIG. 1 by moving the printing head 8 horizontally. In FIG. 1 (and FIG. 2) the letter Z represents each further character.

A switch 6 is provided on the keyboard 1, the actuation of which activates a change or conversion function in the character generator 2. The result is that the printing elements 7 of the printing head 8 are no longer actuated in steps according to the data in columns a through h for the character but in steps according to the data for rows A through H for the character. The resulting script then appears as shown in FIG. 2 where the characters are printed in a manner rotated by 90°, i.e. lying down, in a horizontal line. The row-by-row advance of the record carrier or paper 5 has the result that parallel lines of lying-down characters are printed. The finished paper 5 removed from the machine and rotated clockwise by 90° then shows the text in the manner customary for Chinese script in which the characters are recorded in a column one underneath the other beginning at the top right and with subsequent columns following toward the left.

The described conversion function in the character generator 2 may be accomplished in different ways. A circuit which selectively puts out the data for a character by column or row to an output common to both types of output is disclosed, for example, in DE-OS No. 2,327,474 corresponding to U.S. Pat. No. 3,924,225, issued Dec. 2, 1975 to W. Langnickel. A corresponding control program may also be provided which derives from the data of the complete character the output of actuation signals for the printing elements 7 of the printing head 8 by rows or columns.

In a basically similar process, the text can also be printed with upright or lying-down characters by means of a raster or matrix printer whose printing head has the printing elements arranged horizontally instead of vertically. Here again it is merely necessary to convert the character data in such a way that instead of actuation signals for the individual rows, signals are emitted for the columns. Raster printers whose printing heads include a full set of printing elements for each dot of the raster or grid display of a character require a character generator and a control which can simultaneously apply an actuation signal to all printing elements required to print a character. In this case it is advisable for the character data for one character to be rotated together by 90° by the conversion function, i.e. the actuation informations for the dots in the horizontal coordinates are transformed to those for corresponding vertical coordinates, and vice versa the actuation information for dots disposed in vertical coordinates are converted to those for dots in the corresponding horizontal coordinates.

The same principle can be used correspondingly for devices which additionally or exclusively have a video screen as the recording or display device. If the display on the video screen is also effected in a matrix of dots, the corresponding rotation of the character data can take place in the abovedescribed manner. If the video screen is additionally mounted so that it can be rotated about an axis perpendicular to the plane of the display, the operator is able to rotate the screen in such a manner that he can see the recording during its creation in an upright manner for each type of display.

For printers or video screens in which the characters are not displayed by elements in a matrix but which employ a vectorial display by way of deflecting a recording element, e.g. a printing jet or a printing pin, the transformation or conversion function must transform, in the character generator, the horizontal deflection signals into vertical deflection signals and the vertical deflection signals into horizontal deflection signals so as to be able to print the characters in the respectively other type of display. The converted deflection signals each have the same magnitude as the initial signals so that the character, although rotated by 90°, has the same shape. This measure can also be realized by either a circuit or a program control. A suitable printing system with a vectorially controlled printing device for the display of characters by deflection of an ink jet is disclosed, for example, in U.S. Pat. No. 3,864,692, McDonnel et al. A circuit arrangement for transforming the control signals so as to display the characters in a 90° rotated way is disclosed, for example, in DE-OS No. 2,620,217 corresponding to U.S. Pat. No. 3,976,982, Eiselen et al.

In addition to the above-described embodiments and the printers or video screen employed, other output devices and other control sequences are also conceivable. For example, the transformation or conversion function need not necessarily take place in the character generator but can also be performed, for example, by the machine control; the character input need not be effected by a keyboard, but can take place, for example, over remote lines or from a magnetic data carrier, etc. Moreover, the mode selection switch 6 need not be provided and arranged for actuation by the machine operator. Such switching can also be made within the machine, for example, by the manufacturer by producing one of two possible connections.

It will be understood that the above description of the present invention is susceptible to various modifications, changes and adaptions, and the same are intended to be comprehended within the meaning and range of equivalents of the appended claims.

What is claimed is:

1. In a method for displaying scripts whose characters can be arranged either one next to the other in row lines or one underneath the other in column lines using a display device which displays characters line by line and a character generator which derives, from the data of a stored character supply, actuation signals for the display elements of the display device, said method including the steps of deriving, by means of the character generator and in response to an input signal corresponding to a desired character, actuation signals for the display device representative of the desired character, and displaying the desired characters at desired positions in a display line on a display medium in response to said actuation signals; the improvement comprising: providing a first selectable mode of operation of said character generator wherein said actuation signals will cause the desired individual characters of a display line to be displayed upright and next to one another, and a second selectable mode of operation of said character generator wherein said actuation signals will cause the desired individual characters of a display line to be displayed next to one another but rotated by 90° with respect to the characters in said first mode; and, prior to said step of displaying, selecting one of said first and second modes of operation, whereby the desired characters are displayed next to one another in the same display positions of a display line regardless of the selected mode of operation.

2. The method as defined in claim 1 wherein:
the display device is a raster-type display device containing said elements arranged in vertical or horizontal rows; and wherein said step of deriving includes obtaining said actuation signals for a character to be displayed from the stored data of the rows of a desired character for one of said first and second modes of operation, and from the stored data of the columns of a desired character in the other of said first and second modes of operation.

3. The method defined in claim 1 wherein the display device is a raster-type display having a plurality of recording elements which are actuated in vertical and horizontal coordinates; wherein the actuation signals for the display device normally derived from the stored data corresponds to one of said modes of operation; and wherein the other of said modes of operation is provided by transforming the stored data of a character to be displayed with respect to its actuation information for horizontal coordinates, to that for corresponding vertical coordinates and with respect to its actuation information for vertical coordinates into that for corresponding horizontal coordinates by means of a transformation function in the character generator.

4. The method defined in claim 1 wherein the display device is a vectorially controlled display device; and wherein said first and second modes of operation are provided by: deriving horizontal and vertical deflection signals for the recording element of the display device from the stored data of a desired character to be displayed in one of said first and second modes of operation; and in the other of said first and second modes of operation, transforming said derived horizontal and vertical deflection signals into respective vertical and horizontal deflection signals of the same respective magnitude by means of a transformation function in the character generator.

5. A method as defined in claim 1 wherein the display device displays characters row by row and is normally operated with said first mode of operation with the individual said characters being displayed upright and horizontally next to one another in each row; and wherein, in said second mode of operation, the corresponding individual said characters are displayed horizontally next to one another and in the same position along a row as in said first mode of operation, whereby a machine normally used to provide a display of characters arranged in row lines may be used to provide a display of the same characters arranged, when upright, in column lines.

6. A method as defined in claim 5 wherein the display device is a printer and the display medium is a sheet of paper.

7. A method as defined in claim 1 wherein each of the characters is rotated in the same direction in said second mode of operation.

8. A method as defined in claim 7 wherein each of said characters is rotated in a counter clockwise direction in said second mode of operation.

9. In a method for displaying scripts whose characters can be arranged next to the other in rows or next to one another in columns on a display medium using a display device which displays characters line by line in only one orthogonal direction and a character generator which derives, from the data of a stored character supply, actuation signals for the display device, said method normally including, in response to input signals corresponding to desired characters, and by means of the character generator, deriving first actuation signals for the display device which are representative of the desired characters and which will cause the individual characters of a display line to be displayed upright, feeding said actuation signals to the display device, and displaying the individual desired characters next to one another at desired positions in a display line in response to said first actuation signals; the improvement comprising: in response to a selectable input control signal, transforming said first actuation signals to modified actuation signals which will cause the individual characters of a display line to be displayed rotated by 90° in the same direction with respect to the characters displayed in response to said first actuation signals, feeding said modified actuation signals to the display device instead of said first actuation signals, and displaying the individually rotated characters next to one another at said desired positions in said display line in response to said modified actuation signals, whereby the individual characters of a display line produced following receipt of said control signal will be upright and arranged in the other orthogonal direction upon physical rotation by 90° of the display medium bearing the displayed line of characters.

10. A method as defined in claim 9 wherein said direction of rotation is counter clockwise.

11. A method as defined in claim 9 wherein the display device is a memory typewriter which prints row by row, and said step of displaying include printing the individual characters horizontally next to one another in each row.

12. A method as defined in claim 11 wherein said step of displaying includes sequentially displaying the individual characters of a row from left to right, and said direction of rotation is counter clockwise.

* * * * *